United States Patent
Satake et al.

(10) Patent No.: US 12,494,729 B2
(45) Date of Patent: Dec. 9, 2025

(54) MAGNETIC GEAR EMBEDDED ROTATING ELECTRIC MACHINE CONTROL DEVICE

(71) Applicant: Mitsubishi Electric Corporation, Tokyo (JP)

(72) Inventors: Akira Satake, Tokyo (JP); Tenjiro Hiwatari, Tokyo (JP); Atsushi Yamamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 123 days.

(21) Appl. No.: 18/576,764

(22) PCT Filed: Aug. 3, 2021

(86) PCT No.: PCT/JP2021/028710
§ 371 (c)(1),
(2) Date: Jan. 5, 2024

(87) PCT Pub. No.: WO2023/012888
PCT Pub. Date: Feb. 9, 2023

(65) Prior Publication Data
US 2024/0250626 A1    Jul. 25, 2024

(51) Int. Cl.
*H02P 23/04* (2006.01)
*H02K 49/10* (2006.01)
(Continued)

(52) U.S. Cl.
CPC .......... *H02P 23/04* (2013.01); *H02K 49/102* (2013.01); *H02P 15/00* (2013.01); *H02P 23/26* (2016.02)

(58) Field of Classification Search
CPC .......... H02P 23/04; H02P 15/00; H02P 23/26; H02P 6/10; H02P 17/00; H02P 21/05; H02K 49/102
(Continued)

(56) References Cited

U.S. PATENT DOCUMENTS 9,083,271 B2 *  7/2015  Kim ................. H02P 21/05
2015/0180386 A1  6/2015  Enoki et al.
(Continued)

FOREIGN PATENT DOCUMENTS

CN    110880893 A    3/2020
JP    2005-117842 A    4/2005
(Continued)

OTHER PUBLICATIONS

International Search Report and Written Opinion mailed on Oct. 19, 2021, received for PCT Application PCT/JP2021/028710, filed on Aug. 3, 2021, 9 pages including English Translation.
(Continued)

*Primary Examiner* — David Luo
(74) *Attorney, Agent, or Firm* — XSENSUS LLP

(57) ABSTRACT

A magnetic gear embedded rotating electric machine control device, which controls voltage applied to a stator winding of a rotating electric machine having a magnetic gear therein so that an output from the rotating electric machine follows an output command, includes: a damping command generator which generates a damping command using an angle between a stator and a high-speed rotor of the rotating electric machine detected by an angle detector; a first adder which adds the damping command to the output command, to generate a corrected output command; and an output controller which controls an output generated by the rotating electric machine, in accordance with the corrected output command.

10 Claims, 16 Drawing Sheets

(51) Int. Cl.
*H02P 15/00* (2006.01)
*H02P 23/26* (2016.01)
(58) Field of Classification Search
USPC .................................................. 318/3, 8, 432
See application file for complete search history.

(56) References Cited

U.S. PATENT DOCUMENTS

2016/0006304 A1 1/2016 Tojima et al.
2016/0359441 A1 12/2016 Calverley et al.

FOREIGN PATENT DOCUMENTS

| JP | 2005-224041 | A | 8/2005 |
| JP | 2008-271614 | A | 11/2008 |
| JP | 2014-163431 | A | 9/2014 |
| JP | 2016-025700 | A | 2/2016 |
| JP | 2017-507639 | A | 3/2017 |
| JP | 2020-046012 | A | 3/2020 |

OTHER PUBLICATIONS

Extended European Search Report issued Sep. 3, 2024 in European Patent Application No. 21952718.1, 8 pages.

* cited by examiner

MAGNETIC GEAR EMBEDDED ROTATING ELECTRIC MACHINE CONTROL DEVICE

CROSS-REFERENCE TO RELATED APPLICATION

This application is based on PCT Filing PCT/JP2021/028710, filed Aug. 3, 2021, the entire contents of which are incorporated herein by reference.

TECHNICAL FIELD

The present disclosure relates to a magnetic gear embedded rotating electric machine control device.

BACKGROUND ART

In a conventional magnetic gear embedded rotating electric machine, a high-speed rotor for generating torque and a low-speed rotor which is an output shaft are connected via a magnetic gear mechanism. The magnetic gear mechanism is low in transmission rigidity and readily causes vibration. Thus, it is known that, when the vibration becomes a problem, the magnetic circuit structure inside the magnetic gear mechanism is changed so that a part of a driving force is directly generated on the output shaft not via the magnetic gear mechanism (see, for example, Patent Document 1).

CITATION LIST

Patent Document

Patent Document 1: Japanese Laid-Open Patent Publication No. 2016-25700 (page 13, line 37 to page 14, line 22, and FIG. 11)

SUMMARY OF THE INVENTION

Problem to be Solved by the Invention

In the magnetic gear embedded rotating electric machine disclosed in Patent Document 1, in a case of configuring a device that causes little vibration, operates smoothly, and ensures response up to a high frequency, the design needs to be revised so that the rotating electric machine generates a plurality of driving forces on the output shaft, thus having a problem that the design is complicated and constraints are increased.

In addition, since transmission rigidity for a driving force via the conventional magnetic gear mechanism is originally low, there is a problem with response, and the problem still remains unsolved in a case of using a plurality of driving forces together as in Patent Document 1.

The present disclosure has been made to solve the above problem, and an object of the present disclosure is to provide a magnetic gear embedded rotating electric machine control device that operates smoothly and ensures response up to a high frequency, without changing the structure of a magnetic gear embedded rotating electric machine.

Means to Solve the Problem

A magnetic gear embedded rotating electric machine control device according to the present disclosure is a magnetic gear embedded rotating electric machine control device which controls voltage applied to a stator winding of a rotating electric machine having a magnetic gear therein so that an output from the rotating electric machine follows an output command, the magnetic gear embedded rotating electric machine control device including: a damping command generator which generates a damping command using an angle between a stator and a high-speed rotor of the rotating electric machine; a first adder which adds the damping command to the output command, to generate a corrected output command; and an output controller which controls an output generated by the rotating electric machine, in accordance with the corrected output command.

Effect of the Invention

In the magnetic gear embedded rotating electric machine control device according to the present disclosure, the damping command generator is provided, whereby control is performed in accordance with the corrected output command obtained by adding the damping command to the output command. Thus, it becomes possible to achieve smooth operation and response up to a high frequency, without changing the structure of the magnetic gear embedded rotating electric machine.

DESCRIPTION OF EMBODIMENTS

Figure 1:
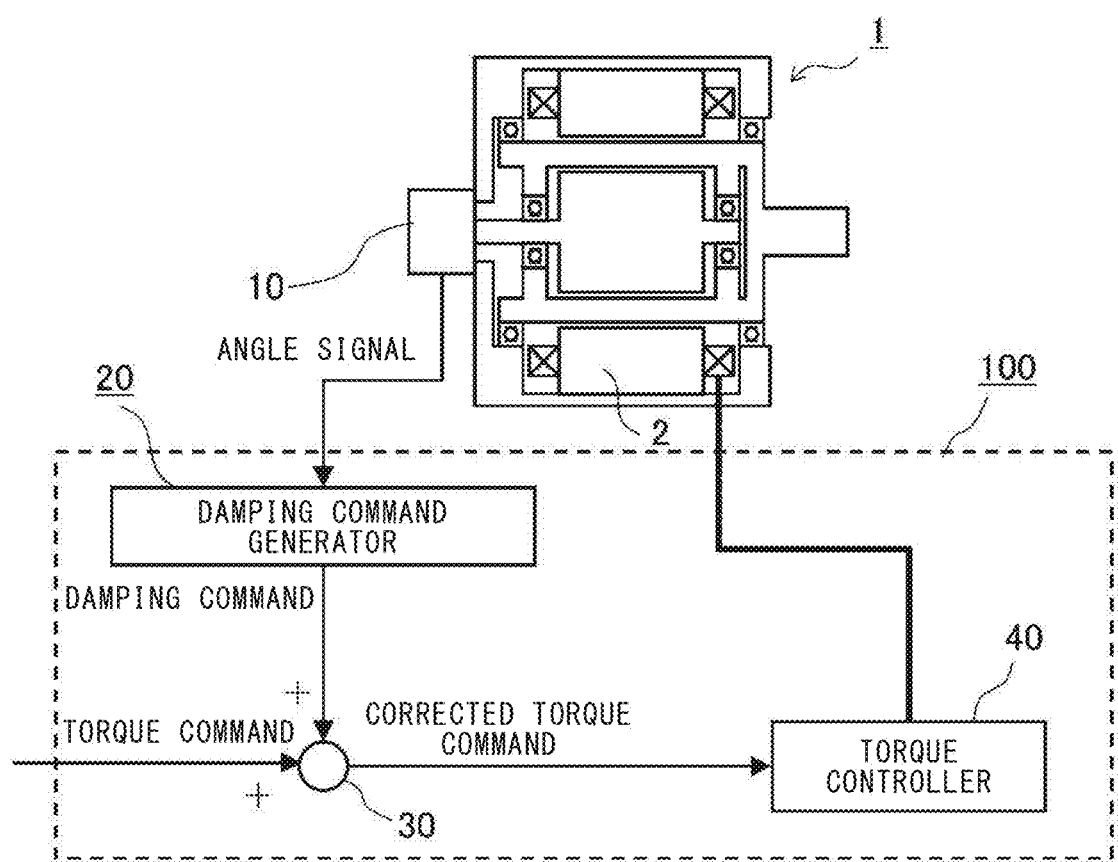
FIG. 1 is a block diagram showing the configuration of a magnetic gear embedded rotating electric machine control device according to embodiment 1.

Hereinafter, embodiments will be described with reference to the drawings. In the drawings, the same reference characters denote the same or corresponding parts.

Embodiment 1

Hereinafter, a magnetic gear embedded rotating electric machine control device according to embodiment 1 will be described with reference to the drawings.

Figure 2:
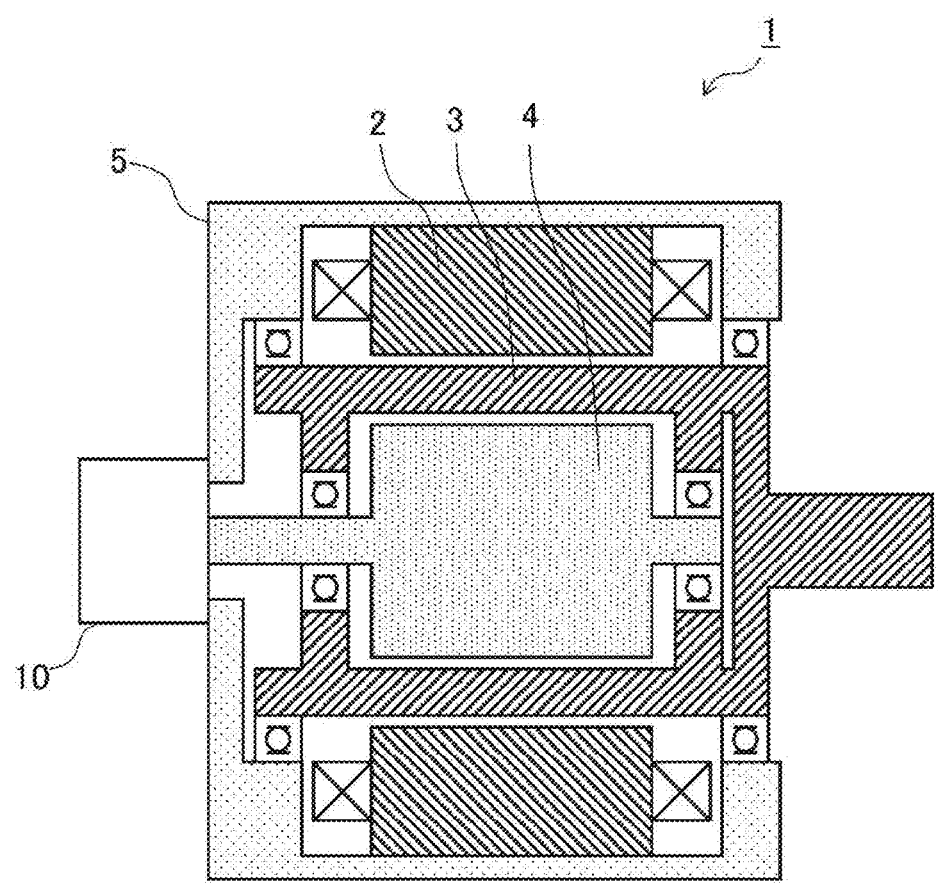
FIG. 2 is a schematic sectional view showing the structure of a magnetic gear embedded rotating electric machine according to embodiment 1.

FIG. 1 is a block diagram showing the configuration of the magnetic gear embedded rotating electric machine control device according to embodiment 1, and FIG. 2 is a schematic sectional view showing the structure of a magnetic gear embedded rotating electric machine. In the drawings, a magnetic gear embedded rotating electric machine 1 has a stator 2 fixed inside a frame 5, and a low-speed rotor 3 rotatably supported by the frame 5. A high-speed rotor 4 is rotatably supported coaxially with the low-speed rotor 3, inside the low-speed rotor 3.

The magnetic gear embedded rotating electric machine 1 is a rotating electric machine including a magnetic gear mechanism and configured such that permanent magnets are provided at least at the outer circumferential surface of the high-speed rotor 4, the high-speed rotor 4 is rotated by a magnetomotive force of a coil of the stator 2, and with the high-speed rotor 4 rotated, the low-speed rotor 3 rotates in accordance with a speed reduction rate.

A magnetic gear embedded rotating electric machine control device 100 (hereinafter, simply referred to as "control device 100") performs control so that torque generated by the rotating electric machine follows a torque command from outside. Accordingly, the control device 100 includes a damping command generator 20 which receives an angle signal detected by an angle detector 10 fixed on the frame 5 of the magnetic gear embedded rotating electric machine 1 to detect an angle between the high-speed rotor 4 and the stator 2, and outputs a damping command, a first adder 30 which adds the damping command to the torque command from outside, to generate a corrected torque command, and a torque controller 40 which operates voltage to be applied to a stator winding terminal of the stator 2 of the rotating electric machine in accordance with the corrected torque command, to control torque generated by the rotating electric machine. In the magnetic gear embedded rotating electric machine 1, it is known that active current and torque are approximately proportional to each other, and therefore the torque controller 40 can be replaced with an active current controller described later. The torque controller and the active current controller correspond to a first output controller and a second output controller, respectively. That is, with respect to torque or active current which is the output of the magnetic gear embedded rotating electric machine 1, voltage to be applied to the stator winding terminal is controlled so that the output follows a corrected output command.

Figure 3:
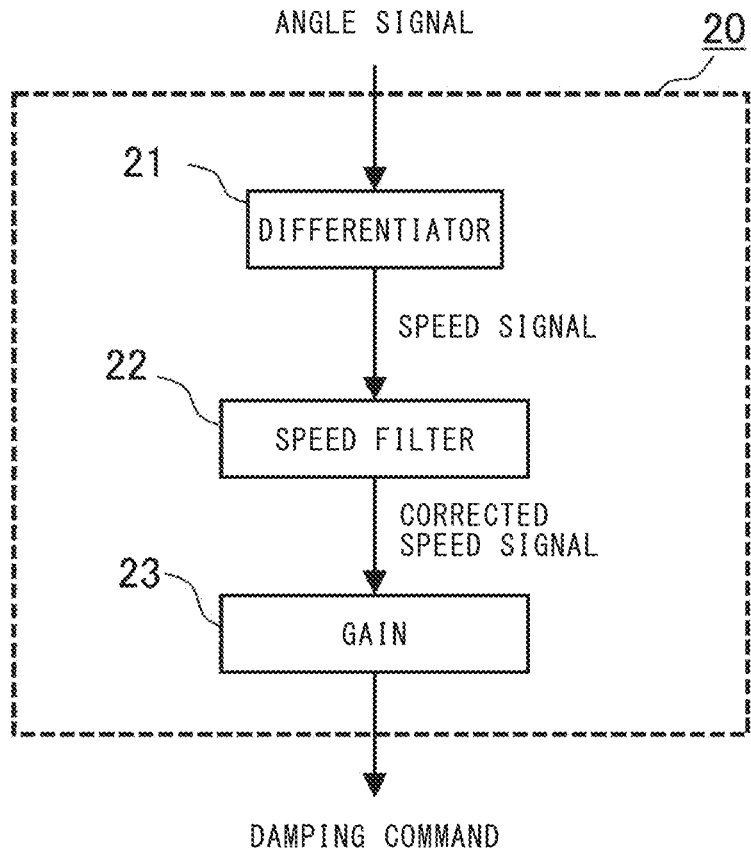
FIG. 3 is a block diagram showing the configuration of a damping command generator according to embodiment 1.

FIG. 3 is a block diagram showing the configuration of the damping command generator 20 according to embodiment 1. The damping command generator 20 includes a differentiator 21, a speed filter 22, and a gain 23. The differentiator 21 differentiates an inputted angle signal and outputs a speed signal, and the speed filter 22 limits the band of the speed signal by a predetermined frequency characteristic and outputs a corrected speed signal. The corrected speed signal is multiplied by the gain 23, whereby a damping command is generated. In general, the gain 23 has a negative value.

Since the control device 100 includes the damping command generator 20, in a case where vibration occurs in the high-speed rotor 4, the vibration is superimposed on the angle signal and thus is detected by the angle detector 10, and a damping command that is proportional to a speed component of the vibration and has a sign opposite thereto is outputted from the damping command generator 20. A component generated by the torque controller 40 in accordance with the damping command causes torque in a direction to suppress vibration of the high-speed rotor 4. Thus, vibration of the high-speed rotor 4 can be suppressed.

On the other hand, in a case where the high-speed rotor 4 performs movement other than vibration, it is desirable that the damping command generator 20 does not generate a damping command that hampers the movement. Therefore, it is preferable that the speed filter 22 is provided inside the damping command generator 20 so that a damping command is generated only when a speed signal in a predetermined frequency range is inputted.

Figure 4:
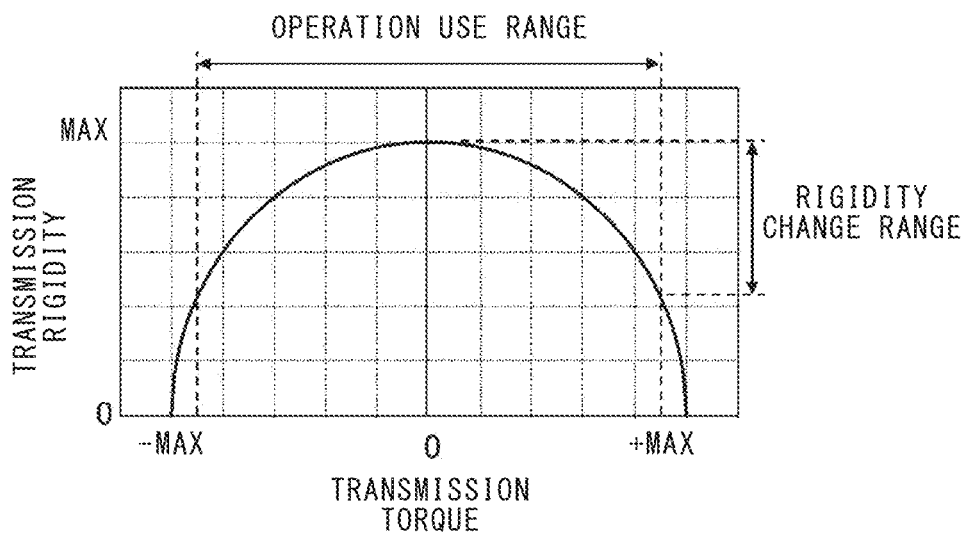
FIG. 4 shows the relationship between transmission torque and transmission rigidity of a magnetic gear mechanism according to embodiment 1.
Figure 5:
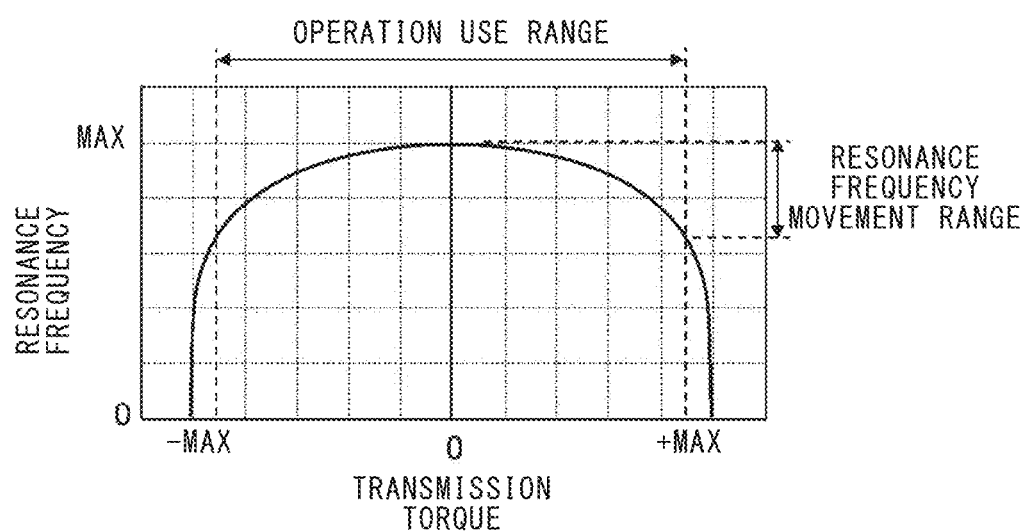
FIG. 5 shows the relationship between transmission torque of the magnetic gear mechanism and a resonance frequency of a high-speed rotor according to embodiment 1.

Vibration occurring in the high-speed rotor 4 is mainly resonant vibration of the high-speed rotor 4, and the resonance frequency thereof is determined by the axial inertia of the high-speed rotor 4 and transmission rigidity of the magnetic gear mechanism formed in the rotating electric machine. FIG. 4 shows the relationship between transmission torque and transmission rigidity of the magnetic gear mechanism, and FIG. 5 shows the relationship between transmission torque and the resonance frequency of the high-speed rotor.

As shown in FIG. 4, transmission rigidity of the magnetic gear mechanism greatly changes depending on torque to be transmitted, and sharply reduces as the transmission torque approaches maximum transmission torque. Therefore, as shown in FIG. 5, the resonance frequency of the high-speed rotor changes with transmission torque, and as a transmission torque range used in operation approaches maximum transmission torque, a resonance frequency movement range also expands.

Figure 6:
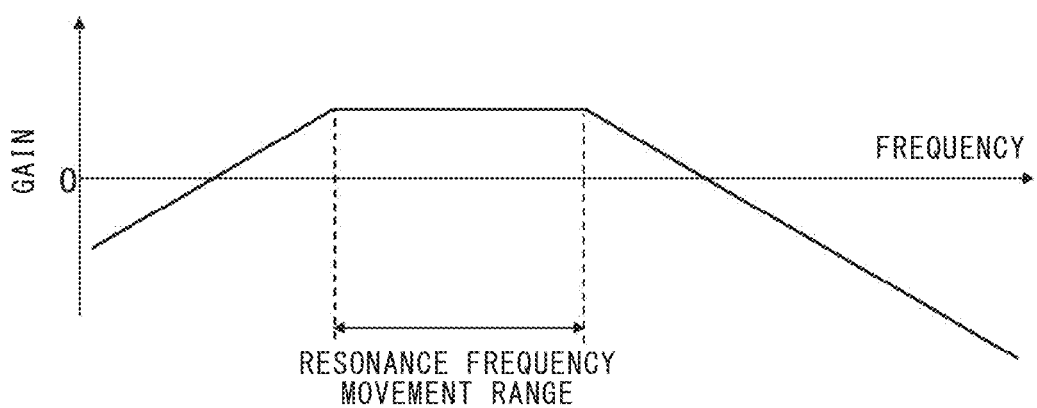
FIG. 6 shows a first frequency characteristic of a speed filter in the damping command generator according to embodiment 1.

In order to adapt to movement of the resonance frequency, if the operation use range of transmission torque has a margin relative to maximum torque, it is preferable that, as shown in FIG. 6, the speed filter 22 is imparted with such a frequency characteristic that signals in a resonance frequency movement range corresponding to a transmission torque range for operation are allowed to pass and signals in the other band are blocked.

Figure 7:
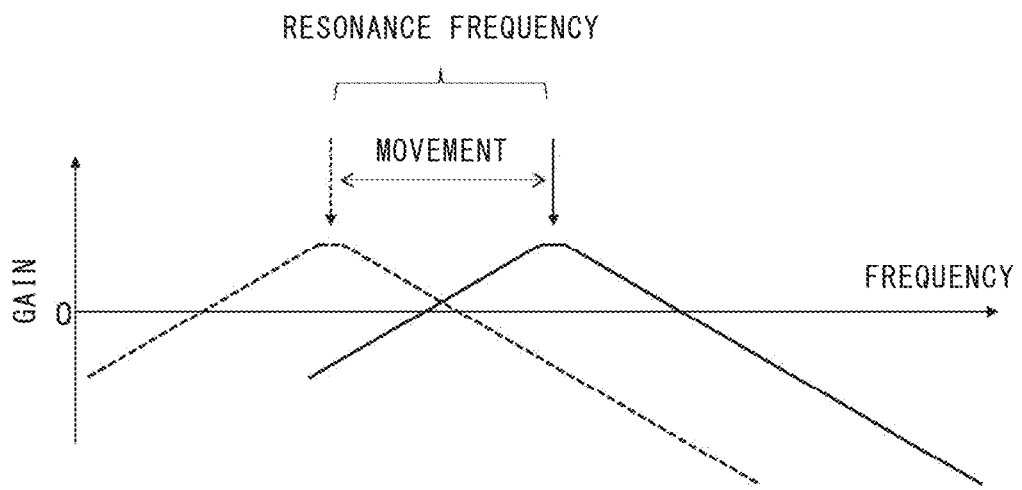
FIG. 7 shows a second frequency characteristic of the speed filter in the damping command generator according to embodiment 1.

On the other hand, in a case where the operation use range of transmission torque is close to maximum torque, it is preferable that, as shown in FIG. 7, the speed filter 22 is imparted with such a characteristic that a frequency band where a signal is allowed to pass is changed in accordance with transmission torque.

In a case of imparting the speed filter 22 with the frequency characteristic shown in FIG. 7, the configuration of the damping command generator 20 may be partially changed accordingly.

Figure 8:
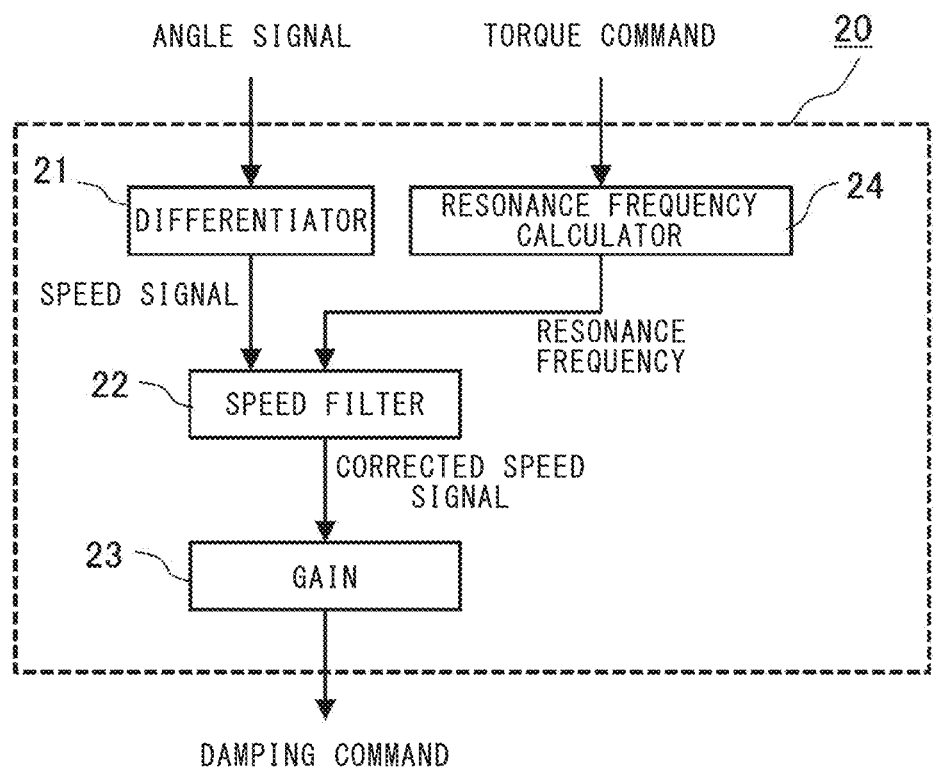
FIG. 8 is a block diagram showing the configuration of another damping command generator according to embodiment 1.

FIG. 8 is a block diagram showing the configuration of another damping command generator according to embodiment 1. A resonance frequency calculator 24 stores the relationship between transmission torque and a resonance frequency as shown in FIG. 5, in a format of an expression or a table obtained in advance, and outputs a resonance frequency in accordance with the inputted torque command. The speed filter 22 has a function of passing only components around the inputted resonance frequency among speed signals as shown in FIG. 7, and the pass frequency changes in accordance with the inputted resonance frequency.

As described above, the control device 100 according to embodiment 1 includes the damping command generator 20 which receives an angle signal from the angle detector 10 for detecting an angle between the high-speed rotor 4 and the stator 2 of the magnetic gear embedded rotating electric machine 1, and generates a damping signal using the angle signal, and the control device 100 performs control in accordance with a corrected torque command obtained by adding the damping command to a torque command which is an output command. With this configuration, resonant vibration occurring in the high-speed rotor 4 can be suppressed and the rotating electric machine 1 can be operated smoothly without changing the structure of the magnetic gear embedded rotating electric machine 1.

In addition, when resonance occurs, a vibration component is superimposed on average torque and maximum torque increases by the amplitude thereof. Then, in a case where maximum torque is limited by maximum transmission torque of the magnetic gear mechanism, when there is resonance, average torque decreases by the amplitude of vibration due to the resonance. In embodiment 1, by suppressing resonant vibration, reduction in the average torque is suppressed and response up to a higher frequency can be achieved.

That is, it is possible to provide a magnetic gear embedded rotating electric machine control device that can control output at a target amount so as to follow a command, up to a high frequency above the resonance frequency of the high-speed rotor, without changing the structure of the magnetic gear embedded rotating electric machine.

Embodiment 2

Figure 9:
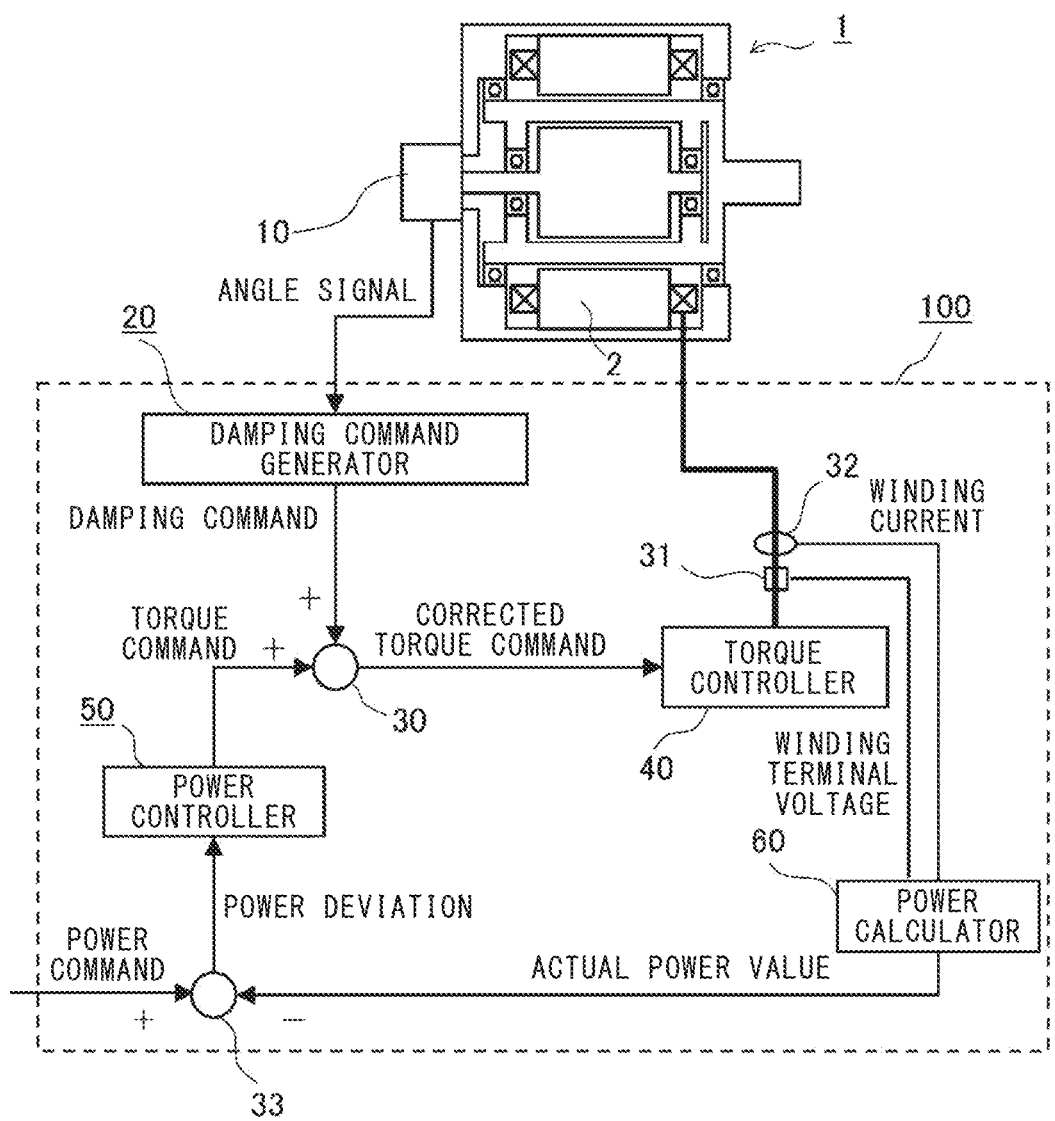
FIG. 9 is a block diagram showing the configuration of a magnetic gear embedded rotating electric machine control device according to embodiment 2.

Hereinafter, a magnetic gear embedded rotating electric machine control device according to embodiment 2 will be described with reference to the drawings. FIG. 9 is a block diagram showing the configuration of a magnetic gear embedded rotating electric machine control device 100 according to embodiment 2. The control device 100 according to embodiment 2 further includes a voltage sensor 31, a current sensor 32, a power calculator 60, a power controller 50, and a second adder 33, in addition to the configuration in FIG. 1 in embodiment 1. The same components as those in embodiment 1 will not be described in detail below.

The control device 100 according to embodiment 2 performs control so that power generated by the rotating electric machine 1 follows a power command from outside.

Hereinafter, with reference to FIG. 9 to FIG. 13, operation of the control device 100 will be described.

The voltage sensor 31 detects terminal voltage of a stator winding of the rotating electric machine, and the current sensor 32 detects current flowing through a stator winding. Normally, the stator winding of the rotating electric machine 1 is composed of multiphase windings, and therefore in actuality, a plurality of voltage sensors 31 and a plurality of current sensors 32 are provided. Instead of a detected value by the voltage sensor 31, a command value for terminal application voltage in the torque controller 40 may be used. The command value for terminal application voltage is a command value for voltage applied to a stator terminal, and is generated in the torque controller 40.

The power calculator 60 calculates active power generated by the rotating electric machine 1, from winding terminal voltage and winding current. For example, an actual power value is calculated from an inner product of voltage and current for each phase of the stator winding, and is outputted. The adder 33 subtracts the actual power value from a power command from outside, to calculate a power deviation. The power deviation is inputted to the power controller 50, and the power controller 50 outputs a torque command so as to control the power deviation to be zero.

Operations of the damping command generator 20, the adder 30, and the torque controller 40 are the same as in embodiment 1, and since it is known that active current and torque are approximately proportional to each other in the rotating electric machine 1, the configuration may be made such that the torque command is replaced with an active current command and the torque controller 40 is replaced with an active current controller.

Figure 10:
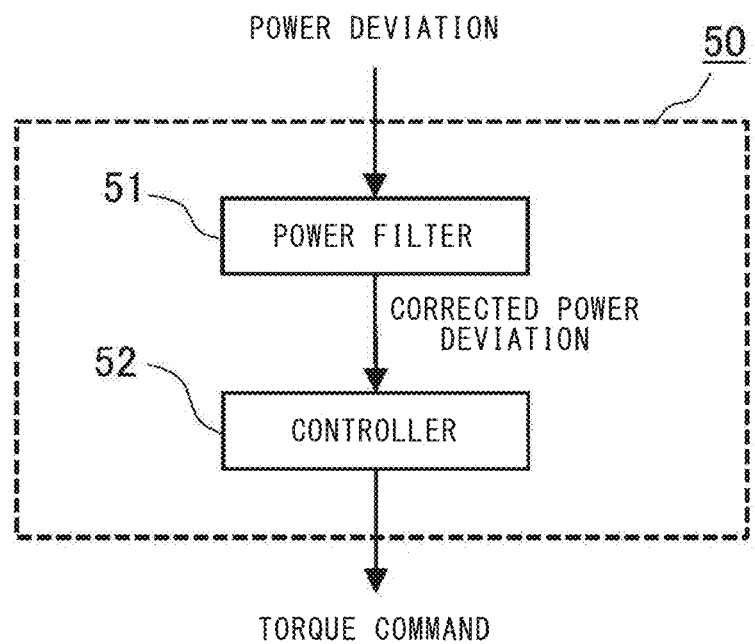
FIG. 10 is a block diagram showing the configuration of a power controller according to embodiment 2.

FIG. 10 is a block diagram showing the configuration of the power controller 50 according to embodiment 2. A power filter 51 applies a predetermined frequency characteristic to the inputted power deviation and outputs a corrected power deviation. A controller 52 is, for example, an integrator or a proportional integrator. The controller 52 processes the inputted corrected power deviation through internal calculation and outputs a torque command. The power controller 50 forms a power feedback control system, together with the torque controller 40, the power calculator 60, and the rotating electric machine 1 which is a control target, and the power filter 51 is provided as necessary in order to improve response and stability of the control system.

Figure 11:
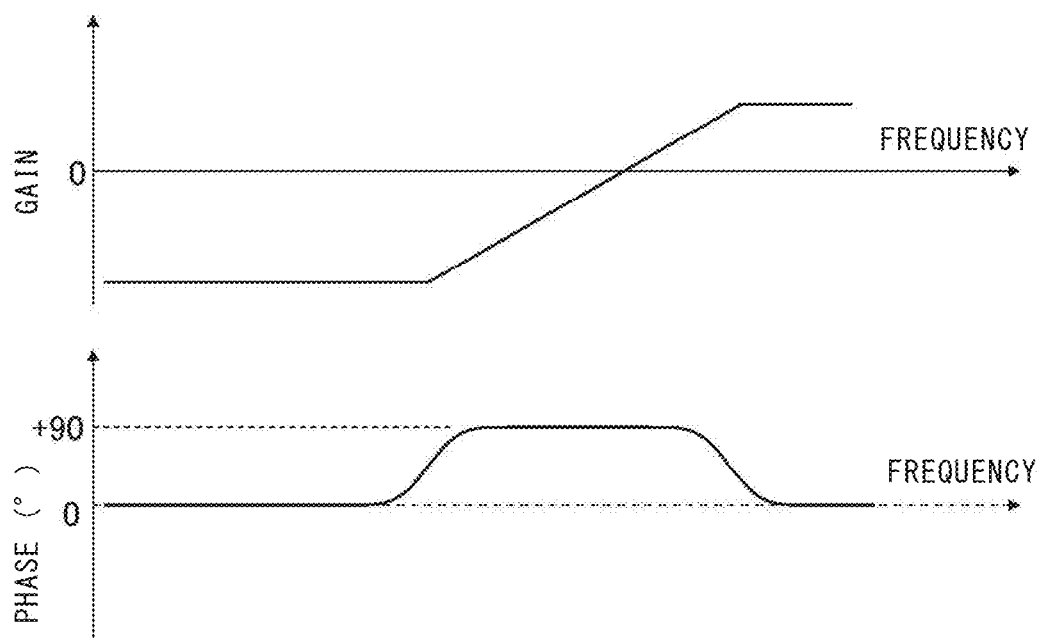
FIG. 11 shows an example of a frequency characteristic of a power filter of the power controller according to embodiment 2.
Figure 12:
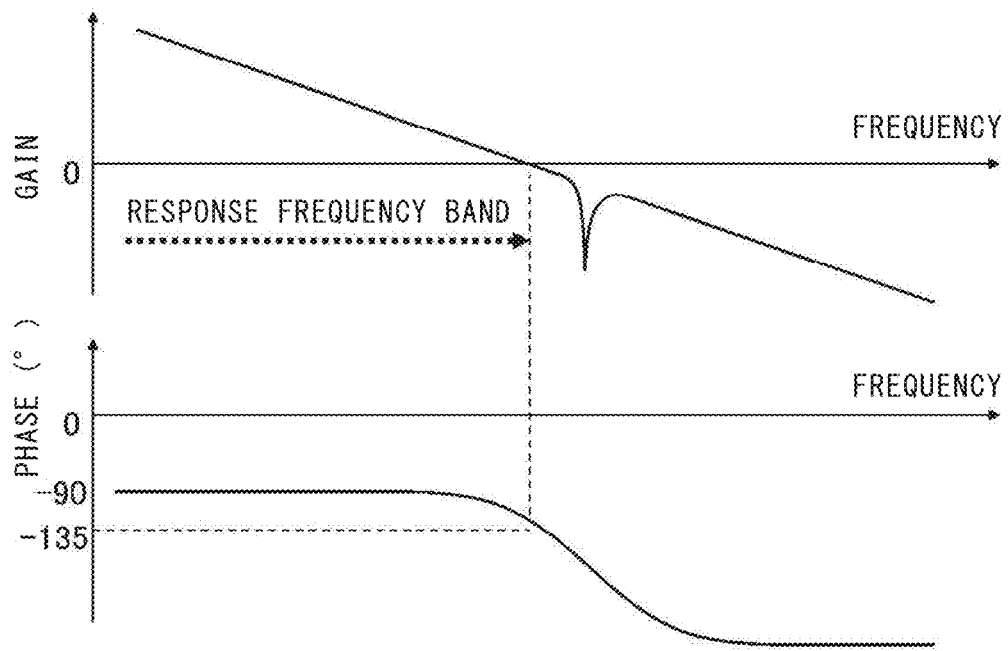
FIG. 12 shows an open-loop response characteristic of a power feedback control system in a case of not using a power filter in the power controller according to embodiment 2.

FIG. 11 shows an example of a frequency characteristic of the power filter 51 in a case of using a lead-lag filter as the power filter 51. FIG. 12 shows an open-loop response characteristic of a power feedback control system in a case of not using the power filter 51, and FIG. 13 shows an open-loop response characteristic of a power feedback control system in a case of using the power filter 51 having the characteristic shown in FIG. 11.

Figure 13:
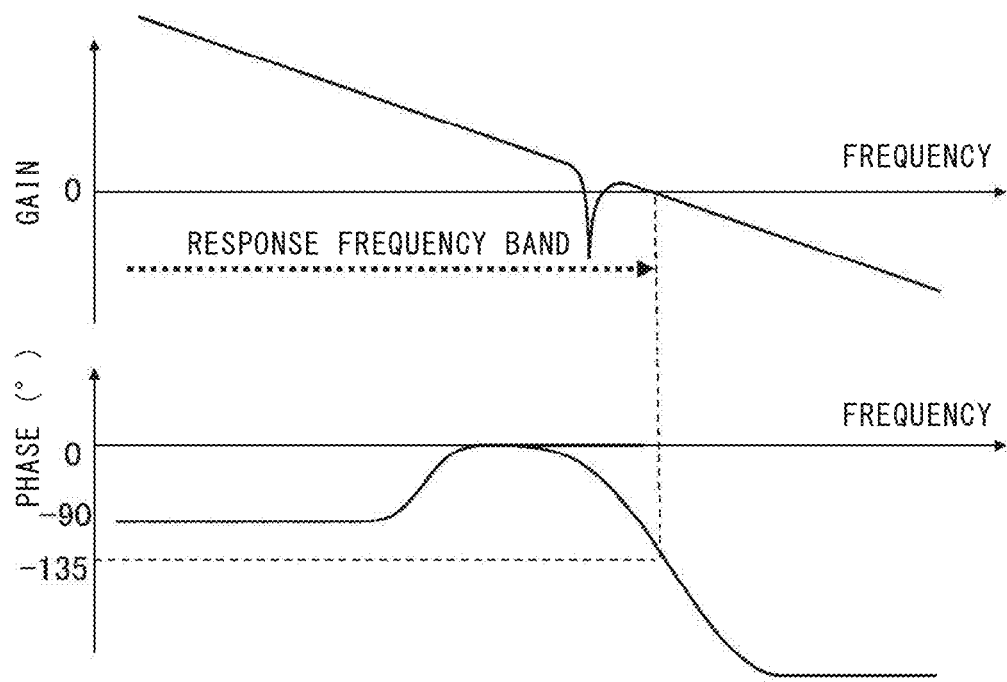
FIG. 13 shows an open-loop response characteristic of a power feedback control system in a case of using a power filter in the power controller according to embodiment 2.

In both of FIG. 12 and FIG. 13, for example, designing is made such that a phase margin is set to be the same value of 45° from a phase of −90°. In this case, the control system needs to be adjusted such that the phase becomes −135° at a frequency where the gain is 0. In FIG. 13 in which the power filter 51 is used, phase lag can be caused at a higher frequency as compared to FIG. 12 in which the power filter 51 is not used. That is, using the power filter 51 can ensure a response frequency band up to a high frequency. Thus, in a case where the control system is required to have response and high stability up to a high-frequency region, the power filter 51 is preferably used.

In the control device 100 according to embodiment 2, when vibration occurs in the high-speed rotor 4, as in embodiment 1, the vibration is detected by the angle detector 10, and a damping command that is proportional to a speed component of the vibration and has a sign opposite thereto is outputted from the damping command generator 20. By the damping command, the torque controller 40 causes torque in a direction to suppress vibration of the high-speed rotor 4. Thus, vibration of the high-speed rotor 4 can be suppressed. In addition, since the power controller 50 is not influenced by vibration of the high-speed rotor 4, power generated by the rotating electric machine 1 can be controlled via the torque controller 40.

In the case of embodiment 1, the speed filter 22 is used so that the damping command generator 20 does not generate a damping command that hampers movement other than vibration of the high-speed rotor 4. However, in a case of having the power controller 50 that performs control so as to follow a power command in a feedback manner as in the control device 100 according to embodiment 2, a component that cancels out a damping command that hampers movement other than vibration of the high-speed rotor 4 from the damping command generator 20 is generated by the power controller 50, and therefore the speed filter 22 need not be used in the damping command generator 20.

As described above, the magnetic gear embedded rotating electric machine control device 100 according to embodiment 2 provides the same effects as in embodiment 1. That is, it becomes possible to smoothly operate the rotating electric machine 1 without changing the structure of the magnetic gear embedded rotating electric machine, and suppress reduction in average power due to temporary torque increase caused by vibration. Further, response up to a high-frequency region can be achieved.

Embodiment 3

Figure 14:
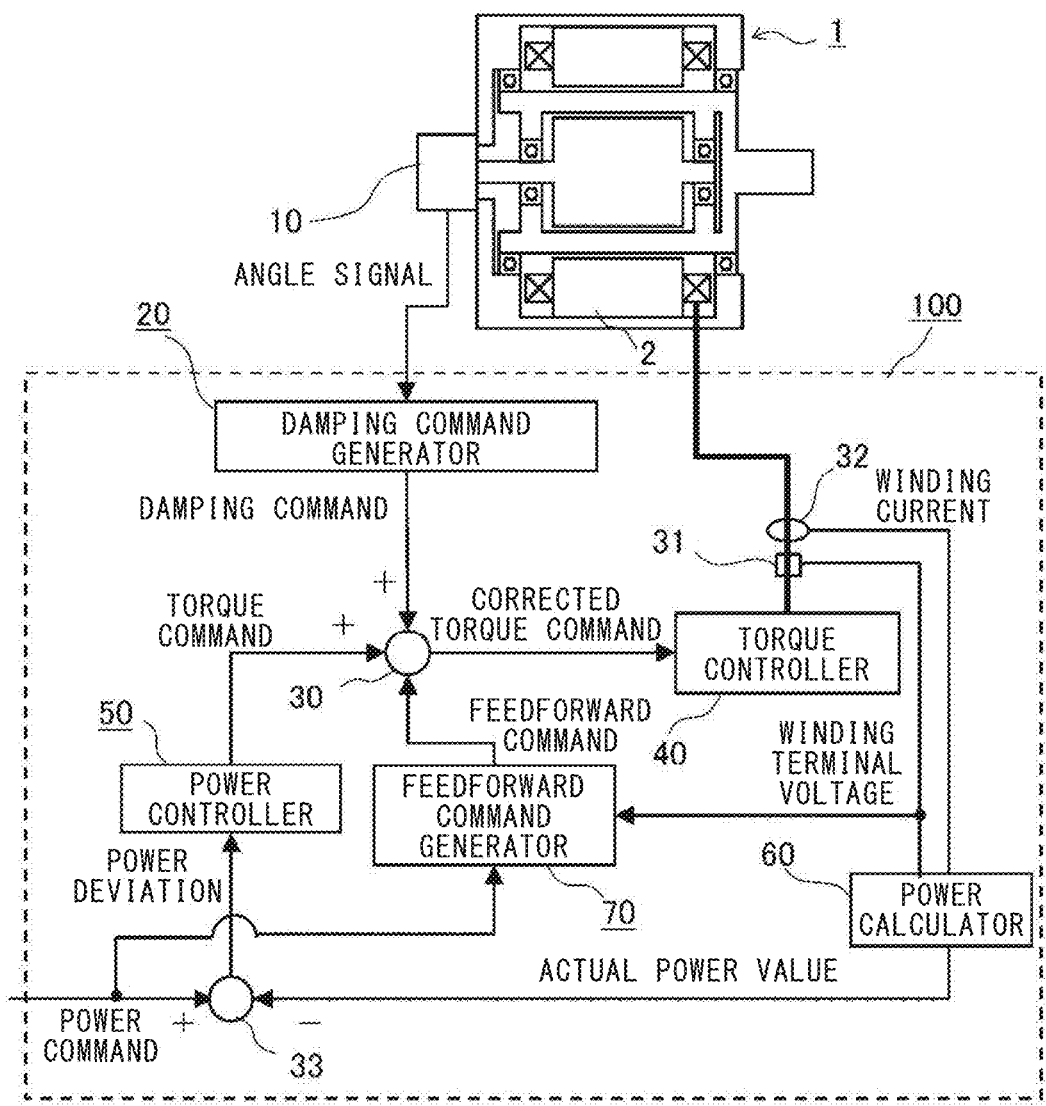
FIG. 14 is a block diagram showing the configuration of a magnetic gear embedded rotating electric machine control device according to embodiment 3.

Hereinafter, a magnetic gear embedded rotating electric machine control device according to embodiment 3 will be described with reference to the drawings. FIG. 14 is a block diagram showing the configuration of a magnetic gear embedded rotating electric machine control device 100 according to embodiment 3. The control device 100 according to embodiment 3 further includes a feedforward command generator 70 in addition to the configuration in FIG. 9 in embodiment 2. The same components as those in embodiments 1 and 2 will not be described in detail below.

The control device 100 according to embodiment 3 performs control so that power generated by the rotating electric machine 1 follows a power command from outside, as in embodiment 2.

Hereinafter, with reference to FIG. 14 and FIG. 15, operation of the control device 100 will be described.

Operations of the power calculator 60, the adder 33, and the power controller 50 are the same as in embodiment 2, and the power controller 50 outputs a torque command so as to control a power deviation to be zero.

Operation of the damping command generator 20 is the same as in embodiment 1, and the feedforward command generator 70 outputs a feedforward command from a power command and winding terminal voltage. The adder 30 adds the damping command and the feedforward command to the torque command, to generate a corrected torque command, and outputs the corrected torque command to the torque controller 40. The torque controller 40 controls torque generated by the rotating electric machine 1, in accordance with the inputted corrected torque command.

Since it is known that active current and torque are approximately proportional to each other in the rotating electric machine 1, the configuration may be made such that the torque command is replaced with an active current command and the torque controller 40 is replaced with an active current controller. As the winding terminal voltage, a command value for terminal application voltage in the torque controller 40 may be used instead of a detected value by the voltage sensor 31.

Figure 15:
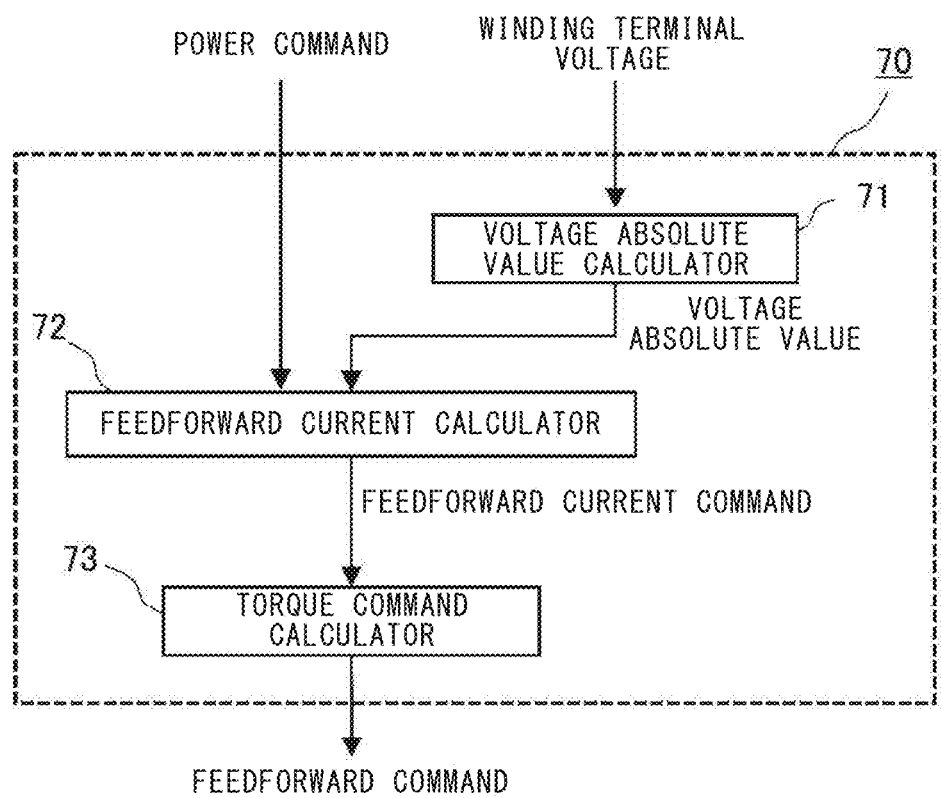
FIG. 15 shows the configuration of a feedforward command generator according to embodiment 3.

FIG. 15 shows the configuration of the feedforward command generator 70. In FIG. 15, a voltage absolute value calculator 71 calculates a voltage absolute value from inputted multiphase winding terminal voltages. Using the power command and the voltage absolute value, a feedforward current calculator 72 calculates a feedforward current command for current to flow to the stator 2 of the rotating electric machine 1, considering the power factor of the rotating electric machine 1. For example, the following calculation expression is used.

Feedforward current command = power command/(voltage absolute value × power factor)

A torque command calculator 73 calculates a feedforward command for torque from the feedforward current command, by multiplying the feedforward current command by a torque constant of the rotating electric machine 1, for example. In a case where the above control system is configured with torque replaced with active current on the basis of the fact that active current and torque of the rotating electric machine 1 are approximately proportional to each other, the feedforward command is the same as the feedforward current command and therefore the torque command calculator 73 is not needed.

The feedforward command outputted from the feedforward command generator 70 configured as described above is calculated without using winding current and therefore is not greatly influenced by resonance inside the rotating electric machine, so that higher-response command generation can be performed. Thus, response of the corrected torque command can be enhanced.

Meanwhile, since actual winding current is not reflected in the feedforward command, error arises, but the error is reflected in the power deviation which is then inputted to the power controller 50. Therefore, the error is suppressed in the power feedback control system.

Further, as in embodiments 1 and 2, resonant vibration occurring in the high-speed rotor 4 is detected by the angle detector 10, and the damping command generated by the damping command generator 20 on the basis of the detected vibration is added to the corrected torque command, whereby resonant vibration of the high-speed rotor 4 can be suppressed.

As described above, the magnetic gear embedded rotating electric machine control device 100 according to embodiment 3 provides the same effects as in embodiments 1 and 2. That is, it becomes possible to smoothly operate the rotating electric machine 1 without changing the structure of the magnetic gear embedded rotating electric machine, and suppress reduction in average power due to temporary torque increase caused by vibration. In addition, response up to a high-frequency region can be achieved. Further, since the corrected torque command is generated considering the feedforward command calculated without using stator winding current, response can be more enhanced.

Embodiment 4

In embodiments 1 to 3, the torque controller 40 has been described, but as described above, in the magnetic gear embedded rotating electric machine, it is known that active current and torque are approximately proportional to each other, and therefore the torque controller 40 can be replaced with an active current controller. In embodiment 4, a configuration in which the torque controller 40 is replaced with an active current controller will be described.

Figure 16:
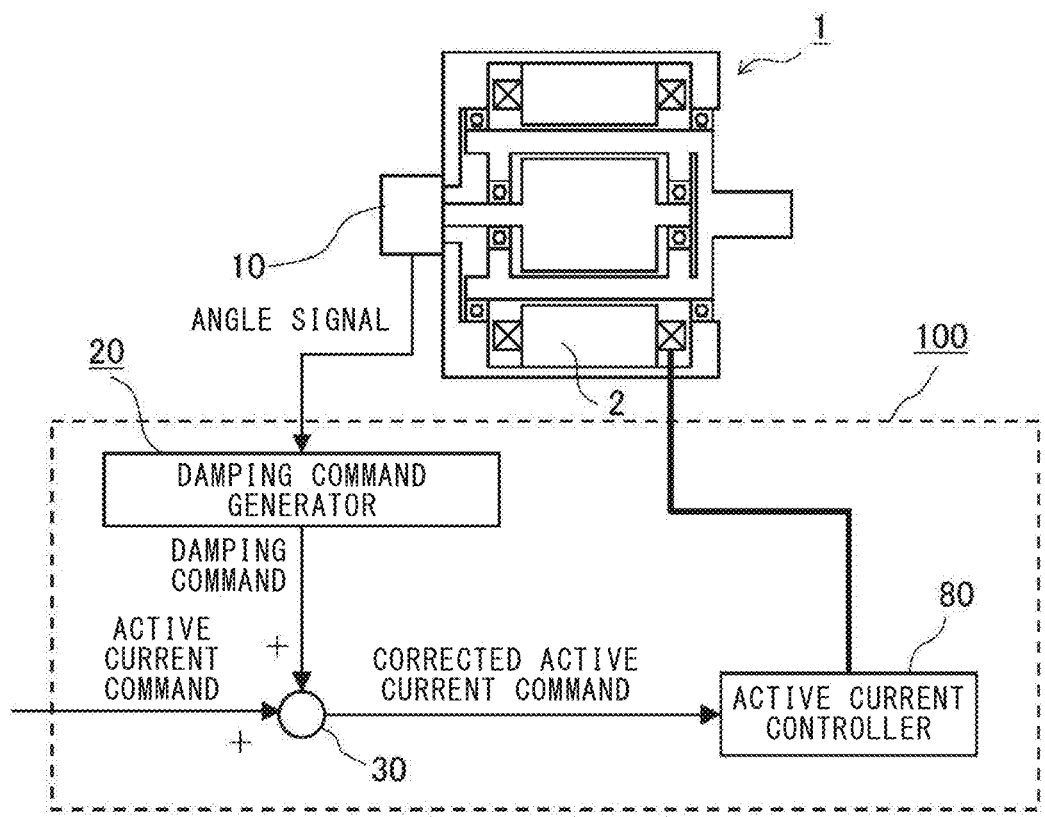
FIG. 16 is a block diagram showing the configuration of a magnetic gear embedded rotating electric machine control device according to embodiment 4.

FIG. 16 is a block diagram showing the configuration of a magnetic gear embedded rotating electric machine control device according to embodiment 4, obtained by replacing the torque controller 40 in FIG. 1 in embodiment 1 with an active current controller 80. The other configurations are the same as those in FIG. 1 and therefore the detailed description thereof is omitted.

In the control device 100 according to embodiment 4, in a case where vibration occurs in the high-speed rotor 4, as in embodiment 1, the vibration is detected by the angle detector 10, and a damping command that is proportional to a speed component of the vibration and has a sign opposite thereto is outputted from the damping command generator 20. By the damping command, the active current controller 80 operates with the active current command corrected in a direction to suppress vibration of the high-speed rotor 4. Thus, vibration of the high-speed rotor 4 can be suppressed. Here, the configuration of the damping command generator 20 is the same as that in FIG. 3.

Figure 17:
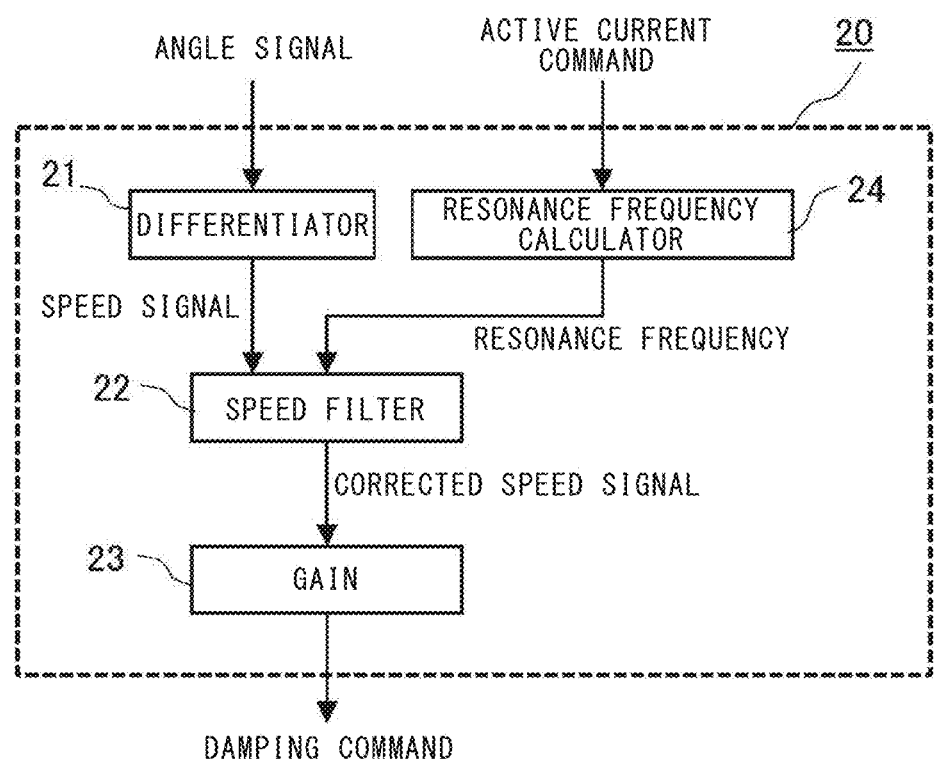
FIG. 17 is a block diagram showing the configuration of a damping command generator according to embodiment 4.

In a case of imparting the speed filter 22 of the damping command generator 20 with the characteristic as shown in FIG. 7, the damping command generator may have a configuration shown in FIG. 17, which corresponds to FIG. 8 in embodiment 1. The resonance frequency calculator 24 stores the relationship between an active current command and a resonance frequency corresponding to the relationship between transmission torque and a resonance frequency shown in FIG. 5, in a format of an expression or a table, in advance, and outputs a resonance frequency in accordance with the inputted active current command. The speed filter 22 has a function of passing only components around the inputted resonance frequency among speed signals as shown in FIG. 7, and the pass frequency changes in accordance with the inputted resonance frequency.

Figure 18:
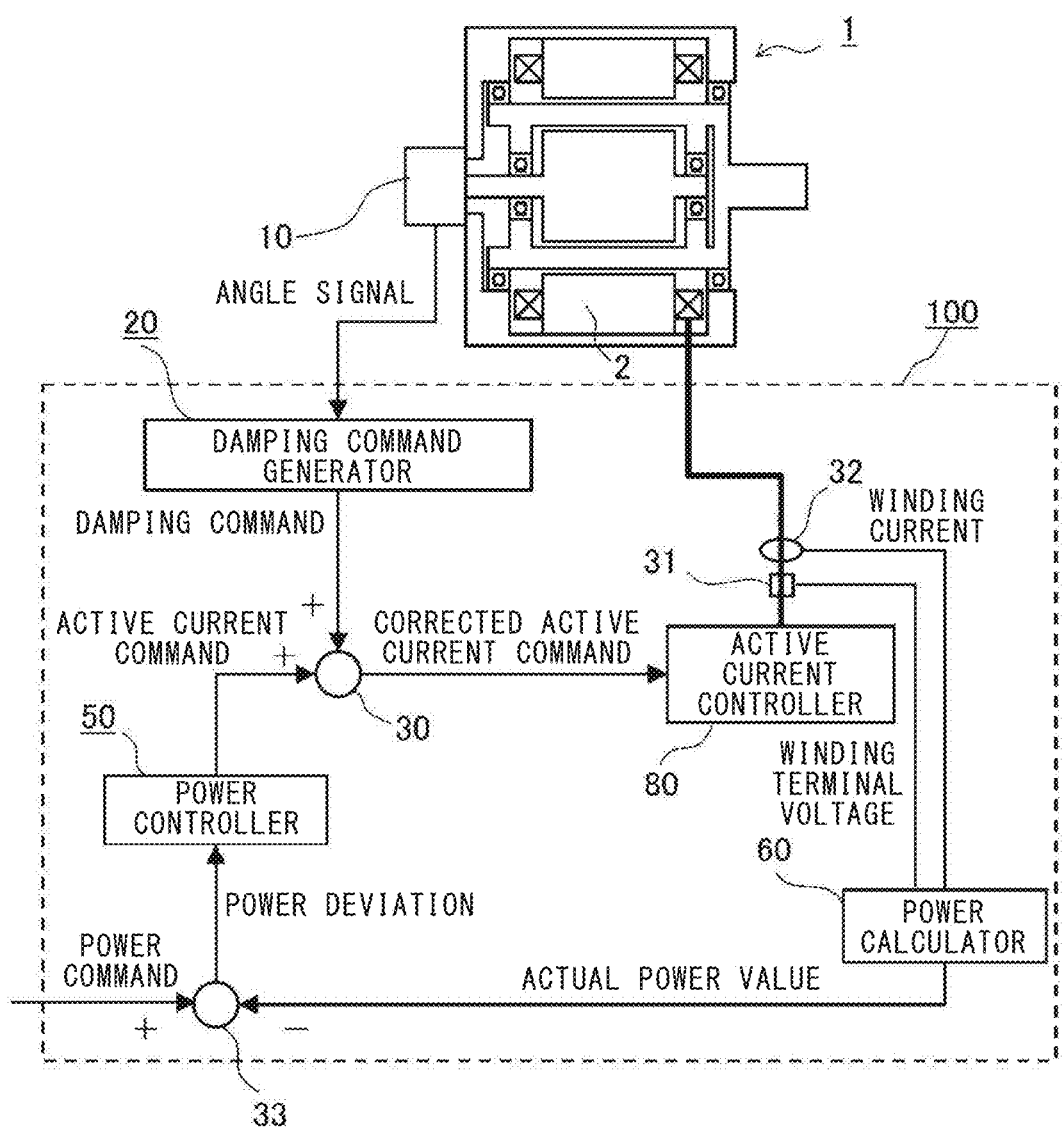
FIG. 18 is a block diagram showing the configuration of another control device for a magnetic gear embedded rotating electric machine according to embodiment 4.

FIG. 18 is a block diagram showing the configuration of another control device for the magnetic gear embedded rotating electric machine according to embodiment 4, obtained by replacing the torque controller 40 in FIG. 9 in embodiment 2 with the active current controller 80. The other configurations are the same as those in FIG. 9 and therefore the detailed description thereof is omitted. The control device 100 performs control via the active current controller 80 so that power generated by the rotating electric machine 1 eventually follows a power command from outside.

Figure 19:
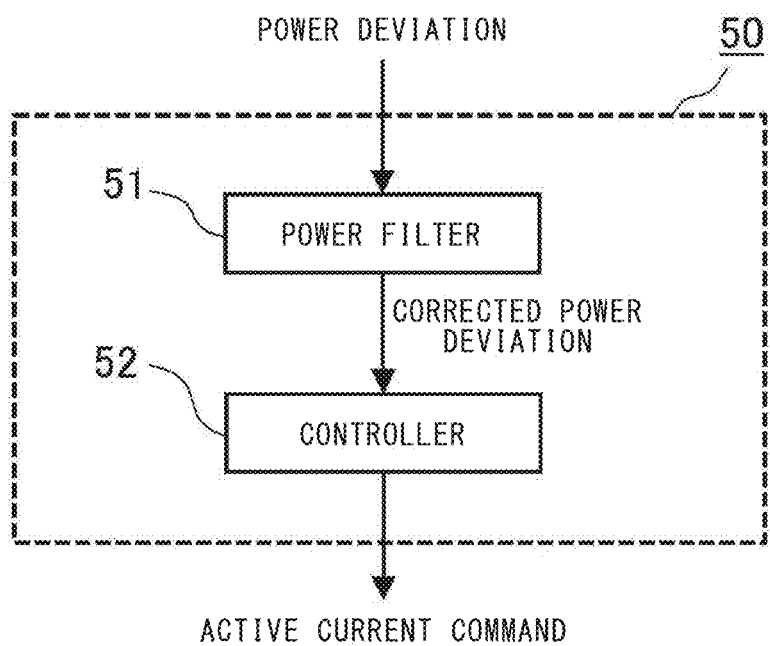
FIG. 19 is a block diagram showing the configuration of a power controller according to embodiment 4.

FIG. 19 is a block diagram showing the configuration of the power controller 50 according to embodiment 4. The power filter 51 applies a predetermined frequency characteristic to the inputted power deviation, and outputs a corrected power deviation. The controller 52 is, for example, an integrator or a proportional integrator. The controller 52 processes the inputted corrected power deviation through internal calculation and outputs an active current command.

With the control device 100 according to embodiment 4 shown in FIG. 18 and FIG. 19, as in embodiment 2, it becomes possible to smoothly operate the rotating electric machine 1 without changing the structure of the magnetic gear embedded rotating electric machine, and suppress reduction in average power due to temporary torque increase caused by vibration. In addition, response up to a high-frequency region can be achieved.

Figure 20:
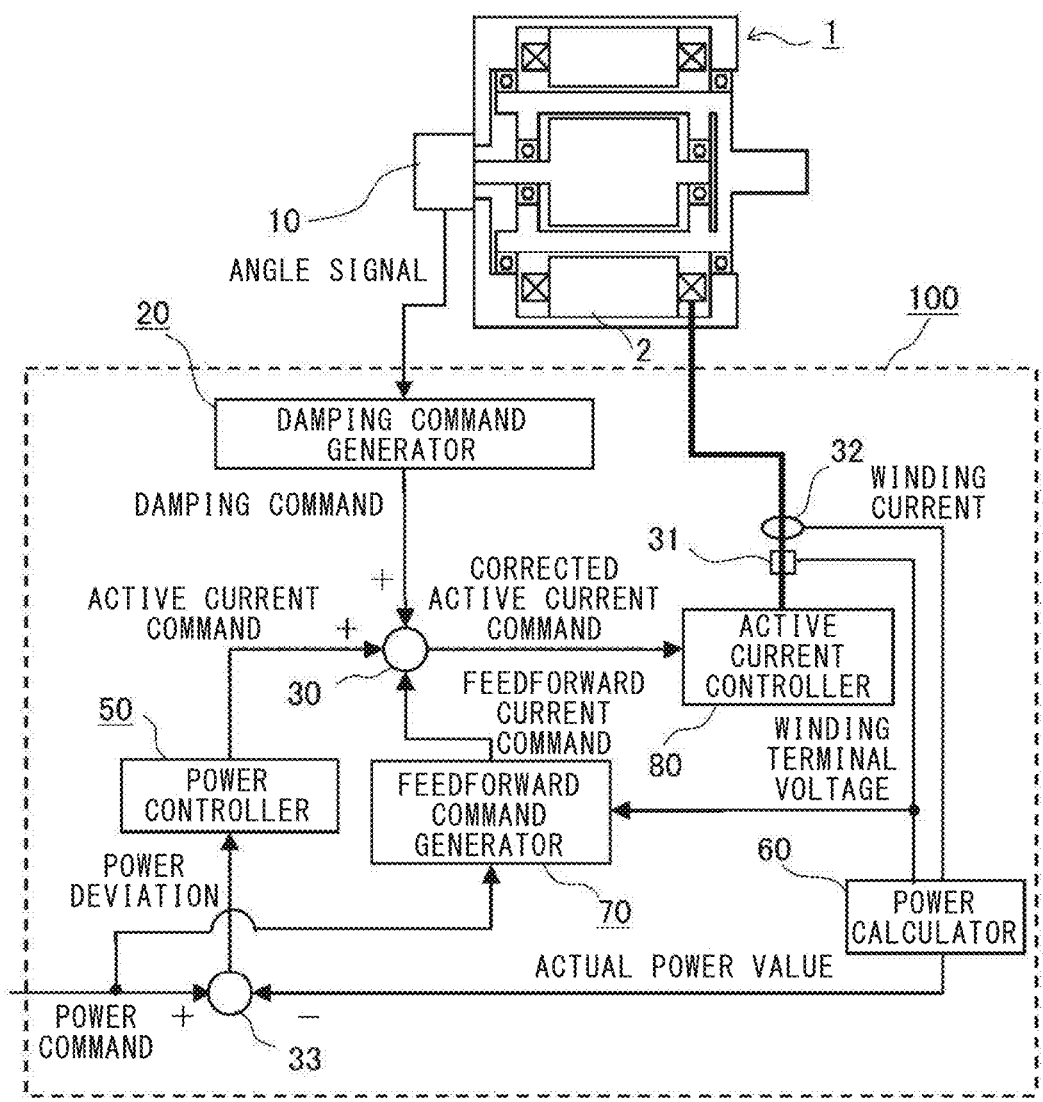
FIG. 20 is a block diagram showing the configuration of still another control device for the magnetic gear embedded rotating electric machine according to embodiment 4.

FIG. 20 is a block diagram showing the configuration of still another control device for the magnetic gear embedded rotating electric machine according to embodiment 4, obtained by replacing the torque controller 40 in FIG. 14 in embodiment 3 with the active current controller 80. The other configurations are the same as those in FIG. 14 and therefore the detailed description thereof is omitted. Also the control device 100 performs control via the active current controller 80 so that power generated by the rotating electric machine 1 eventually follows a power command from outside.

Figure 21:
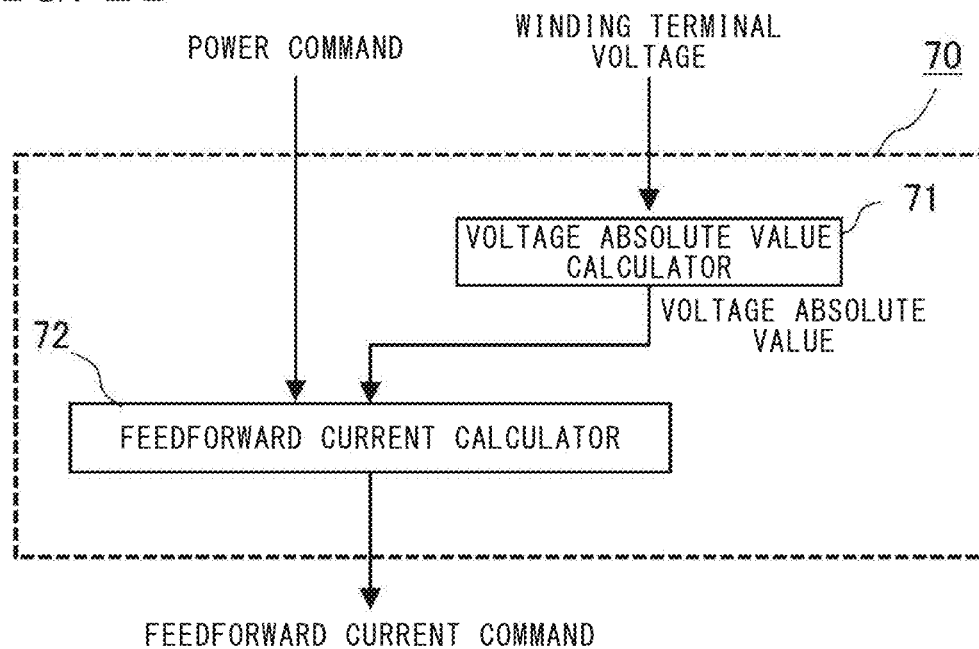
FIG. 21 shows the configuration of a feedforward command generator according to embodiment 4.

FIG. 21 shows the configuration of the feedforward command generator 70. In FIG. 21, the voltage absolute value calculator 71 calculates a voltage absolute value from inputted multiphase winding terminal voltages. Using the power command and the voltage absolute value, the feedforward current calculator 72 calculates a feedforward current command for current to flow to the stator 2 of the rotating electric machine 1, considering the power factor of the rotating electric machine 1.

The feedforward command outputted from the feedforward command generator 70 configured as described above is calculated without using winding current and therefore is not greatly influenced by resonance inside the rotating electric machine, so that high-response command generation can be performed. Thus, response of the corrected active current command can be enhanced.

As described above, according to embodiment 4, the same effects as in embodiments 1 to 3 are provided also by the control device 100 in which the torque controller 40 is replaced with the active current controller 80.

The control device 100 according to each of embodiments 1 to 4 is the control device 100 for the magnetic gear embedded rotating electric machine 1, which controls voltage applied to a stator winding of the rotating electric machine 1 having a magnetic gear therein so that torque, active current, or power which is the output from the rotating electric machine 1 follows a torque command, an active current command, or a power command which is an output command, the control device 100 including the damping command generator 20 which generates a damping command using an angle detected by the angle detector 10 for detecting an angle between the stator 2 and the high-speed rotor 4 of the rotating electric machine 1, the first adder 30 which adds the damping command to the output command (torque command or active current command), to generate a corrected output command (corrected torque command or corrected active current command), and the output controller (torque controller 40 or active current controller 80) which controls an output (torque or active current) generated by the rotating electric machine 1, in accordance with the corrected output command. With this configuration, it becomes possible to achieve smooth operation and response up to a high frequency, without changing the structure of the magnetic gear embedded rotating electric machine 1.

Figure 22:
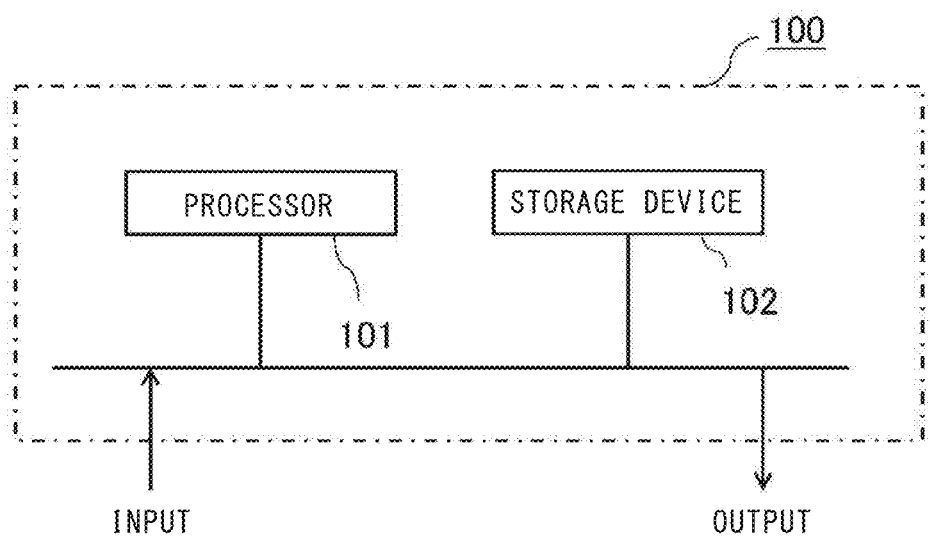
FIG. 22 is a hardware configuration diagram of the magnetic gear embedded rotating electric machine control device according to each of embodiments 1 to 4.

In each of the above embodiments 1 to 4, the control device 100 is composed of a processor 101 and a storage device 102, as shown in a hardware example in FIG. 22. Although not shown, the storage device is provided with a volatile storage device such as a random access memory and a nonvolatile auxiliary storage device such as a flash memory. Instead of the flash memory, an auxiliary storage device of a hard disk may be provided. The processor 101 executes a program inputted from the storage device 102. In this case, the program is inputted from the auxiliary storage device to the processor 101 via the volatile storage device. The processor 101 may output data such as a calculation result to the volatile storage device of the storage device 102, or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 rotating electric machine
2 stator
3 low-speed rotor
4 high-speed rotor
5 frame
10 angle detector
20 damping command generator
21 differentiator
22 speed filter
23 gain
24 resonance frequency calculator
30 adder
31 voltage sensor
32 current sensor
33 adder
40 torque controller
50 power controller
51 power filter
52 controller
60 power calculator
70 feedforward command generator
71 voltage absolute value calculator
72 feedforward current calculator
73 torque command calculator
80 active current controller
100 control device
101 processor
102 storage device

The invention claimed is:

1. A magnetic gear embedded rotating electric machine control device which controls voltage applied to a stator winding of a rotating electric machine having a magnetic gear therein so that an output from the rotating electric machine follows an output command, the magnetic gear embedded rotating electric machine control device comprising:
a damping command generator which generates a damping command using an angle between a stator and a high-speed rotor of the rotating electric machine;
a first adder which adds the damping command to the output command, to generate a corrected output command; and
an output controller which controls an output generated by the rotating electric machine, in accordance with the corrected output command,
wherein
the damping command generator calculates a speed signal from the angle between the stator and the high-speed rotor of the rotating electric machine, and corrects the speed signal using a resonance frequency of the high-speed rotor, to generate the damping command.

2. The magnetic gear embedded rotating electric machine control device according to claim 1, wherein
the output from the rotating electric machine is torque,
the first adder adds the damping command to a torque command, to generate a corrected torque command, and
the output controller is a torque controller which controls torque generated by the rotating electric machine, in accordance with the corrected torque command.

3. The magnetic gear embedded rotating electric machine control device according to claim 2, further comprising:
a power calculator which calculates an actual power value from stator winding current and stator winding terminal voltage of the rotating electric machine;
a second adder which subtracts the calculated actual power value from a power command, to calculate a power deviation; and
a power controller which outputs the torque command from the calculated power deviation.

4. The magnetic gear embedded rotating electric machine control device according to claim 3, further comprising a feedforward command generator which outputs a feedforward command from the power command and the stator winding terminal voltage, wherein
the first adder adds the torque command outputted from the power controller, the damping command, and the feedforward command, to output the corrected torque command.

5. The magnetic gear embedded rotating electric machine control device according to claim 1, wherein
the output from the rotating electric machine is active current,
the first adder adds the damping command to an active current command, to generate a corrected active current command, and
the output controller is an active current controller which controls active current generated by the rotating electric machine, in accordance with the corrected active current command.

6. The magnetic gear embedded rotating electric machine control device according to claim 5, further comprising:
a power calculator which calculates an actual power value from stator winding current and stator winding terminal voltage of the rotating electric machine;
a second adder which subtracts the calculated actual power value from a power command, to calculate a power deviation; and
a power controller which outputs the active current command from the calculated power deviation.

7. The magnetic gear embedded rotating electric machine control device according to claim 6, further comprising a feedforward command generator which outputs a feedforward command from the power command and the stator winding terminal voltage, wherein
  the first adder adds the active current command outputted from the power controller, the damping command, and the feedforward command, to output the corrected active current command.

8. A magnetic gear embedded rotating electric machine control device which controls voltage applied to a stator winding of a rotating electric machine having a magnetic gear therein so that an output from the rotating electric machine follows an output command, the magnetic gear embedded rotating electric machine control device comprising:
  a damping command generator which generates a damping command using an angle between a stator and a high-speed rotor of the rotating electric machine;
  a first adder which adds the damping command to the output command, to generate a corrected output command; and
  an output controller which controls an output generated by the rotating electric machine, in accordance with the corrected output command, wherein
  the output from the rotating electric machine is active current,
  the first adder adds the damping command to an active current command, to generate a corrected active current command, and
  the output controller is an active current controller which controls active current generated by the rotating electric machine, in accordance with the corrected active current command.

9. The magnetic gear embedded rotating electric machine control device according to claim 8, further comprising:
  a power calculator which calculates an actual power value from stator winding current and stator winding terminal voltage of the rotating electric machine;
  a second adder which subtracts the calculated actual power value from a power command, to calculate a power deviation; and
  a power controller which outputs the active current command from the calculated power deviation.

10. The magnetic gear embedded rotating electric machine control device according to claim 9, further comprising a feedforward command generator which outputs a feedforward command from the power command and the stator winding terminal voltage, wherein
  the first adder adds the active current command outputted from the power controller, the damping command, and the feedforward command, to output the corrected active current command.

* * * * *